(12) United States Patent
Orilall et al.

(10) Patent No.: US 9,871,240 B2
(45) Date of Patent: Jan. 16, 2018

(54) ELECTROSPINNING FOR INTEGRATED SEPARATOR FOR LITHIUM-ION BATTERIES

(71) Applicant: Applied Materials, Inc., Santa Clara, CA (US)

(72) Inventors: Mahendra Christopher Orilall, Santa Clara, CA (US); Raman Talwar, Palo Alto, CA (US); Karl M. Brown, Santa Clara, CA (US); Lu Yang, Fremont, CA (US); Hooman Bolandi, San Jose, CA (US); Victor Pebenito, San Jose, CA (US); Connie P. Wang, Mountain View, CA (US); Robert Z. Bachrach, Burlingame, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 287 days.

(21) Appl. No.: 14/746,771

(22) Filed: Jun. 22, 2015

(65) Prior Publication Data
US 2015/0372271 A1    Dec. 24, 2015

Related U.S. Application Data

(62) Division of application No. 13/224,709, filed on Sep. 2, 2011, now Pat. No. 9,065,122.
(Continued)

(51) Int. Cl.
*H01M 2/16* (2006.01)
*B05B 5/025* (2006.01)
(Continued)

(52) U.S. Cl.
CPC ......... *H01M 2/1666* (2013.01); *H01M 2/162* (2013.01); *H01M 2/1646* (2013.01);
(Continued)

(58) Field of Classification Search
None
See application file for complete search history.

(56) References Cited

U.S. PATENT DOCUMENTS

| 5,665,491 | A | * | 9/1997 | Tomiyama | ............ | H01M 4/131 |
|---|---|---|---|---|---|---|
| | | | | | | 429/218.1 |
| 6,432,586 | B1 | | 8/2002 | Zhang | | |

(Continued)

FOREIGN PATENT DOCUMENTS

| CN | 101562243 A | 10/2009 |
|---|---|---|
| CN | 101611506 A | 12/2009 |

(Continued)

OTHER PUBLICATIONS

Office Action for Japanese Application No. 2013-531607 dated Jul. 12, 2016.
(Continued)

*Primary Examiner* — Rena D Cronin
(74) *Attorney, Agent, or Firm* — Patterson + Sheridan LLP

(57) ABSTRACT

Embodiments of the present invention relate generally to lithium-ion batteries, and more specifically, to batteries having integrated separators and methods of fabricating such batteries. In one embodiment, a lithium-ion battery having an electrode structure is provided. The lithium-ion battery comprises an anode stack, a cathode stack, and a porous electrospun polymer separator comprising a nano-fiber backbone structure. The anode stack comprises an anodic current collector and an anode structure formed over a first surface of the anodic current collector. The cathode stack comprises a cathodic current collector and a cathode structure formed over a first surface of the cathodic current
(Continued)

collector. The porous electrospun polymer separator is positioned between the anode structure and the cathode structure.

10 Claims, 12 Drawing Sheets

Related U.S. Application Data

(60) Provisional application No. 61/388,498, filed on Sep. 30, 2010.

(51) Int. Cl.
| | |
|---|---|
| H01M 4/485 | (2010.01) |
| H01M 4/505 | (2010.01) |
| H01M 4/525 | (2010.01) |
| H01M 4/58 | (2010.01) |
| H01M 10/0525 | (2010.01) |

(52) U.S. Cl.
CPC ......... *H01M 2/1686* (2013.01); *H01M 4/485* (2013.01); *H01M 4/505* (2013.01); *H01M 4/525* (2013.01); *H01M 4/5815* (2013.01); *H01M 4/5825* (2013.01); *H01M 10/0525* (2013.01); *B05B 5/0255* (2013.01); *H01M 2220/10* (2013.01); *H01M 2220/20* (2013.01); *H01M 2220/30* (2013.01); *Y02E 60/122* (2013.01)

(56) References Cited

U.S. PATENT DOCUMENTS

| | | | |
|---|---|---|---|
| 7,112,389 | B1 | 9/2006 | Arora et al. |
| 7,279,251 | B1 | 10/2007 | Yun et al. |
| 8,426,054 | B2 | 4/2013 | Usami et al. |
| 8,815,432 | B2 | 8/2014 | Jo et al. |
| 8,822,082 | B2 | 9/2014 | Katayama et al. |
| 2003/0148181 | A1 | 8/2003 | Wang et al. |
| 2006/0024569 | A1* | 2/2006 | Hennige ............... H01M 2/162 429/144 |
| 2006/0147795 | A1* | 7/2006 | Li ........................ H01M 4/13 429/209 |
| 2006/0286446 | A1 | 12/2006 | Chun et al. |
| 2007/0264577 | A1* | 11/2007 | Katayama ............ H01M 2/162 429/246 |
| 2009/0026662 | A1 | 1/2009 | Yun et al. |
| 2009/0029261 | A1 | 1/2009 | Thomas-Alyea et al. |
| 2009/0087728 | A1 | 4/2009 | Less et al. |
| 2009/0148547 | A1 | 6/2009 | Petras et al. |
| 2009/0155678 | A1 | 6/2009 | Less et al. |
| 2010/0015530 | A1* | 1/2010 | Katayama ............... H01G 9/02 429/246 |
| 2010/0031617 | A1 | 2/2010 | Ensor et al. |
| 2010/0034914 | A1 | 2/2010 | Petras et al. |
| 2010/0119932 | A1* | 5/2010 | Nakura ................. H01M 2/348 429/163 |
| 2011/0031105 | A1 | 2/2011 | Miyanaga |
| 2012/0219841 | A1* | 8/2012 | Bolandi .................. C23C 26/00 429/144 |

FOREIGN PATENT DOCUMENTS

| | | |
|---|---|---|
| JP | 2001319634 A | 11/2001 |
| JP | 2003533861 A | 11/2003 |
| JP | 2003533862 A | 11/2003 |
| JP | 2006527911 A | 12/2006 |
| JP | 2010500717 A | 1/2010 |
| JP | 201044935 | 2/2010 |
| JP | 2010103050 A | 5/2010 |
| JP | 2010194726 A | 9/2010 |
| WO | 2001089022 A1 | 11/2001 |
| WO | 2007054039 A1 | 5/2007 |
| WO | 2008139727 A2 | 1/2008 |
| WO | 2008106903 A2 | 9/2008 |
| WO | 2008106904 A1 | 9/2008 |
| WO | 2009049563 A2 | 4/2009 |
| WO | 2009135446 A2 | 11/2009 |
| WO | 2010063244 A2 | 6/2010 |
| WO | 2010102593 A2 | 9/2010 |

OTHER PUBLICATIONS

Atsushi Ueki, Kagaku Daijiten, Kabushiki Kaisha Tokyo Kagaku Dojin, 1989, p. 824.

Office Action for Japanese Application No. 2013-531607 dated Sep. 1, 2015.

Seiichi Honma, Plastic Pocketbook, Kogyo Chosakai Publishing Co., Ltd, 2003, Full Revised Edition, pp. 120-123.

Kazuo Shinozaki et al., Fabrication and Optical Properties of Pb((Mg1/3Nb2/3)O3—PbTiO3 Thin Films on Si Substrates Using the PLD Method, IEEE Transactions on Ultrasonics, Ferroelectrics, and Frequency Control, 2008, vol. 55, No. 5, pp. 1023-1028.

Office Action and Search Report for Chinese Application No. 201180051043.7 dated Sep. 29, 2014.

International Search Report and Written Opinion dated Apr. 20, 2012 for International; Application No. PCT/US2011/050394.

Burger et al., "Nanofibrous Materials and Their Applications." Annu. Rev.; Mater. Res., 2006, 36: pp. 333-368.

Huang et al., "A Review on Polymer Nanofibers by Electrospinning and; Their Applications in Nanocomposites." Composites Science and Technology 63; I (2003), pp. 2223-2253.

Greiner et al., "Electrospinning: A Fascinating Method for the; Preparation of Ultrathin Fibers." Angew. Chem. Int. Ed., 2007,46, pp. 5670-5703.

Japanese Office Action in Japanese Application No. 2013-531607 dated Apr. 11, 2017.

* cited by examiner

US 9,871,240 B2

ELECTROSPINNING FOR INTEGRATED SEPARATOR FOR LITHIUM-ION BATTERIES

CROSS-REFERENCE TO RELATED APPLICATIONS

This application is a divisional of U.S. patent application Ser. No. 13/224,709 filed on Sep. 2, 2011, which claims benefit of U.S. provisional patent application Ser. No. 61/388,498, filed Sep. 30, 2010, which are both herein incorporated by reference.

GOVERNMENT RIGHTS IN THIS INVENTION

This invention was made with Government support under DE-AR0000063 awarded by DOE. The Government has certain rights in this invention.

BACKGROUND

Field

Embodiments of the present invention relate generally to high-capacity energy storage devices, and more specifically, to batteries having integrated separators and methods of fabricating such batteries.

Description of the Related Art

Fast-charging, high-capacity energy storage devices, such as supercapacitors and lithium-ion (Li-ion) batteries, are used in a growing number of applications, including portable electronics, medical, transportation, grid-connected large energy storage, renewable energy storage, and uninterruptible power supply (UPS).

Li-ion batteries typically include an anode electrode, a cathode electrode and a separator positioned between the anode electrode and the cathode electrode. The separator is an electronic insulator, which provides physical and electrical separation between the cathode and the anode electrodes. The separator is typically made from micro-porous polyethylene and polyolefin, and is applied in a separate manufacturing step. During electrochemical reactions, i.e., charging and discharging, Li-ions are transported through the pores in the separator between the two electrodes via an electrolyte. Thus, high porosity is desirable to increase ionic conductivity. However, some high porosity separators are susceptible to electrical shorts when lithium dendrites formed during cycling create shorts between the electrodes.

Currently, battery cell manufacturers purchase separators, which are then laminated together with anode and cathode electrodes in separate processing steps. Other separators are made by wet or dry extrusion of a polymer and then stretched to produce holes (tears) in the polymer. The separator is also one of the most expensive components in the Li-ion battery and accounts for over 20% of the material cost in battery cells.

For most energy storage applications, the charge time and capacity of energy storage devices are important parameters. In addition, the size, weight, and/or expense of such energy storage devices can be significant limitations. The use of current separators has a number of drawbacks. Namely, such materials limit the minimum size of the electrodes constructed from such materials, suffer from electrical shorts, require complex manufacturing methods, and expensive materials.

Accordingly, there is a need in the art for faster charging, higher capacity energy storage devices with separators that are smaller, lighter, and can be more cost effectively manufactured.

SUMMARY

Embodiments of the present invention relate generally to high-capacity energy storage devices, and more specifically, to batteries having integrated separators and methods of fabricating such batteries. In one embodiment, a lithium-ion battery having an electrode structure is provided. The lithium-ion battery comprises an anode stack, a cathode stack, and a porous electrospun polymer separator comprising a nano-fiber backbone structure. The anode stack comprises an anodic current collector and an anode structure formed over a first surface of the anodic current collector. The cathode stack comprises a cathodic current collector and a cathode structure formed over a first surface of the cathodic current collector. The porous electrospun polymer separator is positioned between the anode structure and the cathode structure.

In another embodiment, a method of forming an electrode structure is provided. The electrode structure comprises providing a first electrode structure and electrospinning a nano-fiber backbone structure directly onto a surface of the first electrode structure to form a porous electrospun polymer separator.

In yet another embodiment, an in-line substrate processing system for forming an integrated separator over a flexible conductive substrate is provided. The in-line substrate processing system comprises a microstructure formation chamber for forming at least a portion of an electrode structure over the flexible conductive substrate, an electrospinning chamber for forming at least a portion of a porous electrospun polymer separator directly on the electrode structure, and a substrate transfer mechanism configured to transfer the flexible conductive substrate among the chambers. The substrate transfer mechanism comprises a feed roll disposed out side a processing volume of each chamber and configured to retain a portion of the flexible conductive substrate within the processing volume of each chamber and a take up roll disposed out side the processing volume and configured to retain a portion of the flexible conductive substrate, wherein the substrate transfer mechanism is configured to activate the feed rolls and the take up rolls to move the flexible conductive substrate in and out each chamber, and hold the flexible conductive substrate in the processing volume of each chamber.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
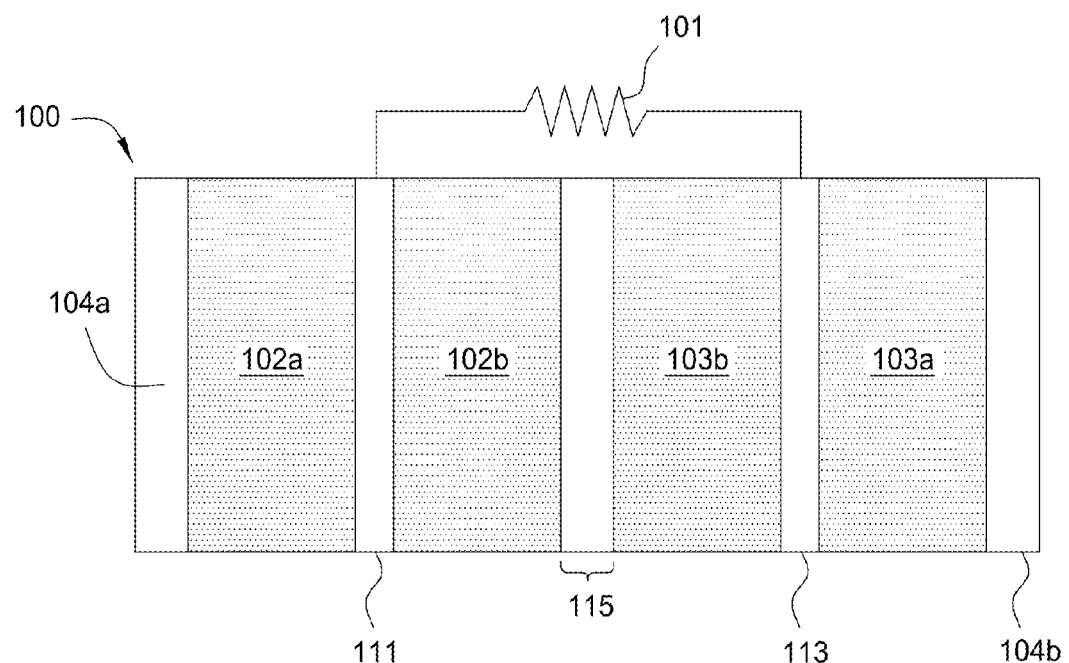
FIG. 1A is a schematic diagram of a partial Li-ion battery cell bi-layer with an electrospun polymer separator according to embodiments described herein.

Embodiments of the present invention relate generally to high-capacity energy storage devices, and more specifically, to batteries having integrated separators and methods of fabricating such batteries. In certain embodiments, direct deposition of an electrospun integrated separator directly onto battery electrodes is provided. The separator may be either a single layer to achieve low cost or multi-layered to achieve improved performance. The electrospun separator may comprise a porous polymer. The electrospun polymer may comprise multiple polymers. The porous polymer may comprise polymer fibers, which are directly electrospun onto an electrode such as a cathode and/or anode. The electrospun separator may further comprise ceramic particles. The ceramic particles may be co-deposited with the polymer fibers. The ceramic polymers may be subsequently deposited in the pores of the porous polymer structure. In certain embodiments where the polymer is electrospun, the polymer may have a random or "spaghetti-like" network. Ceramic particles may be deposited into the pores of the porous "spaghetti-like" network. One example of such polymer fibers includes semi-crystalline polyamides, such as Nylon 6.6, which has a melting temperature ($T_m$) of approximately 250° C. Another example is polyvinylidene fluoride (PVDF) fibers with $T_m$ of approximately 170° C. Another example is a co-polymer such as PVDF-HFP (polyvinylidene+hexafluoropropene). The coated cathode and anode structures may be laminated together to form a battery cell stack.

Electrospinning is a technique where electrical forces produce a jet derived from a polymer solution. The jet may be derived from the tip of a capillary or may be derived in a needless process. When a sufficiently high voltage is applied to a liquid droplet or film of the polymer solution, the body of the liquid becomes charged, and electrostatic repulsion counteracts the surface tension and the droplet is stretched, at a critical point a stream of liquid erupts from the surface. This point of eruption is known as the Taylor cone. If the molecular cohesion of the liquid is sufficiently high, stream breakup does not occur (if it does, droplets are electrosprayed) and a charged liquid jet is formed. As the jet dries in flight, the mode of current flow changes from ohmic to convective as the charge migrates to the surface of the fiber. The jet is then elongated by a whipping process caused by electrostatic repulsion initiated at small bends in the fiber, until it is finally deposited on a grounded collector. The elongation and thinning of the fiber resulting from this bending instability leads to the formation of uniform fibers with nanometer-scale diameters.

While the particular apparatus in which the embodiments described herein can be practiced is not limited, it is particularly beneficial to practice the embodiments on a web-based roll-to-roll system sold by Applied Materials, Inc., Santa Clara, Calif. Exemplary roll-to-roll and discrete substrate systems on which the embodiments described herein may be practiced are described in further detail in commonly assigned U.S. patent application Ser. No. 12/620,788, to Lopatin et al., titled APPARATUS AND METHOD FOR FORMING 3D NANOSTRUCTURE ELECTRODE FOR ELECTROCHEMICAL BATTERY AND CAPACITOR, now published as US 2010/0126849, commonly assigned U.S. patent application Ser. No. 12/839,051, filed Jul. 19, 2010, to Bachrach et al, titled COMPRESSED POWDER 3D BATTERY ELECTRODE MANUFACTURING, now published as US 2011/0129732, and commonly assigned U.S. patent application Ser. No. 12/880,564, filed Sep. 13, 2010, to Bachrach et al., titled SPRAY DEPOSITION MODULE FOR AN IN-LINE PROCESSING SYSTEM, all of which are herein incorporated by reference in their entirety.

Parameters that may affect the formation of fibers include solution properties (e.g., conductivity, surface tension, viscosity, and elasticity), the distance between the capillary tube, electric potential at the capillary tip, and ambient parameters (e.g., humidity, solution temperature, and air velocity).

The polymer solution or separator forming solution may comprise one or more polymers diluted in a solvent system. Exemplary polymer materials include carboxymethyl cellulose (CMC), Nylon-6, 6, Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene (PE), Polyethylene terephthalate (PET), Polyolefin, Polyphenyl ether (PPE), Polyvinyl chloride (PVC), Polyvinylidene chloride (PVDC), Polyvinylidene fluoride (PVDF), Poly(vinylidenefluoride-co-hexafluoropropylene (PVDF-HFP), Polyvinyl-pyridine, Polylactic acid (PLA), Polypropylene (PP), Polybutylene (PB), Polybutylene terephthalate (PBT), Polyamide (PA), Polyimide (PI), Polycarbonate (PC), Polytetrafluoroethylene (PTFE), Polystyrene (PS), Polyester (PE), Acrylonitrile butadiene styrene (ABS), Poly(methyl methacrylate) (PMMA), Polyoxymethylene (POM), Polysulfone (PES), Styrene-acrylonitrile (SAN), Polyacrylonitrile (PAN), Styrene-butadiene rubber (SBR), Ethylene vinyl acetate (EVA), Styrene maleic anhydride (SMA), and combinations thereof. The polymer may comprise from about 0.5 wt. % and about 30 wt. % of the total weight of the separator forming solution.

The separator forming solution further comprises a solvent system. The solvent system may comprise any solvent, which is capable of dissolving the one or more polymer components. Exemplary solvent systems include N-Methylpyrrolidone (NMP), acetone, ethyl acetate, propyl acetate, water, formic acid, dimethyl formamide, dichloromethane, tetrahydrofuran, isopropyl alcohol, and combinations thereof. The solvent system may comprise the remainder of the separator forming solution. The solvent system may comprise from about 70 wt. % to about 99.5 wt. % of the total weight of the separator forming solution.

The separator forming solution may further comprise inorganic components. The inorganic components may be selected from a variety of materials that are compatible with the battery materials and chemistry into which the integrated separator is incorporated. The inorganic material may be a ceramic material. Exemplary ceramic materials include $BaTiO_3$, $HfO_2$ (hafnia), $SrTiO_3$, $TiO_2$ (titania), $SiO_2$ (silica), $Al_2O_3$ (alumina), $ZrO_2$ (zirconia), $SnO_2$, $CeO_2$, MgO, CaO, $Y_2O_3$, $CaCO_3$, and combinations thereof. In one embodiment, the ceramic particles are selected from the group comprising $SiO_2$, $Al_2O_3$, MgO, and combinations thereof.

The size of the ceramic particles may be selected such that the particle size is less than the diameter of the polymer fibers and the particles will not clog the deposition system. In certain embodiments, the ceramic particles may have a particle size between about 5 nm to about 0.3 μm. The particles may be less than 300 nm in diameter, or less than 100 nm in diameter, and more typically from about 10-20 nm in diameter. The small particle size of the ceramic particles makes it more difficult for lithium dendrites formed during the cycling process from growing through the separator and causing shorts.

Ceramic particles may be added to the polymer solution using a sol-gel process. In a sol-gel process, inorganic precursors are added to the polymer solution and react to form ceramic particles in the polymer solution. For example, inorganic precursors such as $TiCl_4$ and $Ti(OH)_4$ are added to the polymer solution and react to form $TiO_2$ sol particles. Thus, the precursors for the ceramic particles are added to the polymer solution. The ceramic particles may form as the precursors are mixed or in some cases, the precursors may require heating the mixture or heating the fibers after they have been electrospun. The heating temperature will be less than the melting temperature of the polymer fibers.

The polymer fibers may be formed from a polymer melt. Polymers, which are molten at high temperatures, may be used in the melt process. Electrospinning of the polymer melt is similar to the process for electrospinning of the polymer solution, however, electrospinning of the polymer melt is performed in a vacuum environment. The charged melt jet, substrate that the melt is deposited on are typically encapsulated in a vacuum environment. Exemplary polymers, which may be electrospun in melt form, include Polyethylene (PE), Polypropylene (PP), Nylon 12, PA-12, Polyethylene terephthalate (PET), Polyethylene naphthalate (PEN), PET/PEN blends, and combinations thereof.

Figure 1B:
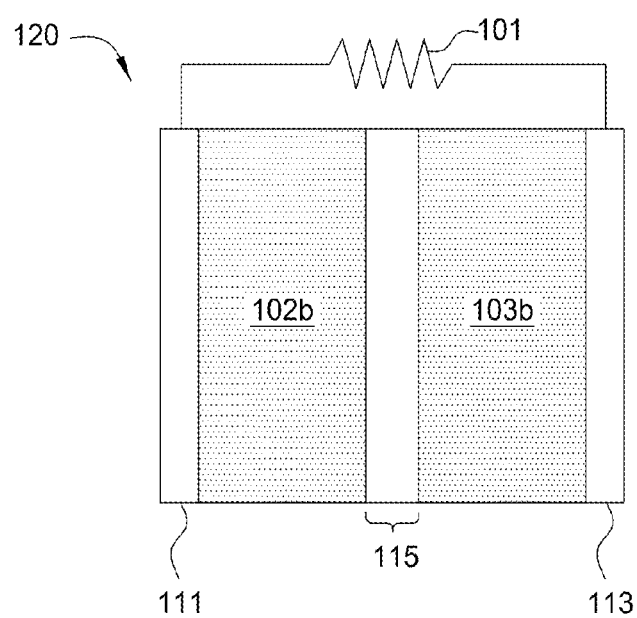
FIG. 1B is a schematic diagram of a partial Li-ion battery cell with an electrospun polymer separator according to embodiments described herein.

FIG. 1A is a schematic diagram of a partial Li-ion battery cell bi-layer 100 with an electrospun separator 115 according to one embodiment described herein. FIG. 1B is a schematic diagram of a partial Li-ion battery cell 120 with an electrospun separator according to embodiments described herein. The Li-ion battery cells 100, 120 are electrically connected to a load 101, according to one embodiment described herein. The primary functional components of the Li-ion battery cell bi-layer 100 include anode structures 102a, 102b, cathode structures 103a, 103b, separator layers 104a, 104b, electrospun separator 115, current collectors 111 and 113 and an electrolyte (not shown) disposed within the region between the separator layers 104a, 104b. The primary functional components of the Li-ion battery cell 120 include anode structure 102b, cathode structures 103b, electrospun separator 115, current collectors 111 and 113 and an electrolyte (not shown) disposed within the region between the current collectors 111, 113. A variety of materials may be used as the electrolyte, for example, a lithium salt in an organic solvent. The Li-ion battery cells 100, 120 may be hermetically sealed with electrolyte in a suitable package with leads for the current collectors 111 and 113. The anode structures 102a, 102b, cathode structures 103a, 103b, electrospun separator 115, and fluid-permeable separator layers 104a, 104b are immersed in the electrolyte in the region formed between the separator layers 104a and 104b. It should be understood that a partial exemplary structure is shown and that in certain embodiments the separator layers 104a and 104b are replaced with electrospun separator layers similar to electrospun separator layer 115 followed by corresponding anode structures, cathode structures, and current collectors.

Anode structure 102b and cathode structure 103b serve as a half-cell of Li-ion battery 100. Anode structure 102b includes a metal anodic current collector 111 and a first electrolyte containing material, such as a carbon-based intercalation host material for retaining lithium ions. Similarly, cathode structure 103b includes a cathodic current collector 113 respectively and a second electrolyte containing material, such as a metal oxide, for retaining lithium ions. The current collectors 111 and 113 are made of electrically conductive material such as metals. In one embodiment, the anodic current collector 111 comprises copper and the cathodic current collector 113 comprises aluminum. In certain embodiments, the electrospun separator layer 115 is used to prevent direct electrical contact between the components in the anode structure 102b and the cathode structure 103b.

The electrolyte containing porous material on the cathode side of the Li-ion battery cell 100, 120 or positive electrode, may comprise a lithium-containing metal oxide, such as lithium cobalt dioxide ($LiCoO_2$) or lithium manganese dioxide ($LiMnO_2$). The electrolyte containing porous material may be made from a layered oxide, such as lithium cobalt oxide, an olivine, such as lithium iron phosphate, or a spinel, such as lithium manganese oxide. In non-lithium embodiments, an exemplary cathode may be made from $TiS_2$ (titanium disulfide). Exemplary lithium-containing oxides may be layered, such as lithium cobalt oxide ($LiCoO_2$), or mixed metal oxides, such as $LiNi_xCo_{1-2x}MnO_2$, $LiNi_{0.5}Mn_{1.5}O_4$, $Li(Ni_{0.8}Co_{0.15}Al_{0.05})O_2$, $LiMn_2O_4$. Exemplary phosphates may be iron olivine ($LiFePO_4$) and it is variants (such as $LiFe_{1-x}MgPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

The electrolyte containing porous material on the anode side of the Li-ion battery cell 100, 120 or negative electrode, may be made from materials described above, for example, graphitic particles dispersed in a polymer matrix and/or various fine powders, for example, micro-scale or nano-scale sized powders. Additionally, microbeads of silicon, tin, or lithium titanate ($Li_4Ti_5O_{12}$) may be used with, or instead of, graphitic microbeads to provide the conductive core anode material. Exemplary cathode materials, anode materials, and methods of application are further described in commonly assigned U.S. patent application Ser. No. 12/839,051, filed Jul. 19, 2010 titled COMPRESSED POWDER 3D BATTERY ELECTRODE MANUFACTURING, now published as US 2011/0129732, and commonly assigned U.S. patent application Ser. No. 12/953,134, filed Jan. 13, 2010, titled GRADED ELECTRODE TECHNOLOGIES FOR HIGH ENERGY LITHIUM-ION BATTERIES, now published as US 2011/0168550, both of which are herein incorporated by reference in their entirety. It should also be understood that although a Li-ion battery cell bi-layer 100 is depicted in FIG. 1, the embodiments described herein are not limited to Li-ion battery cell bi-layer structures. It should also be understood, that the anode and cathode structures may be connected either in series or in parallel.

Figure 2:
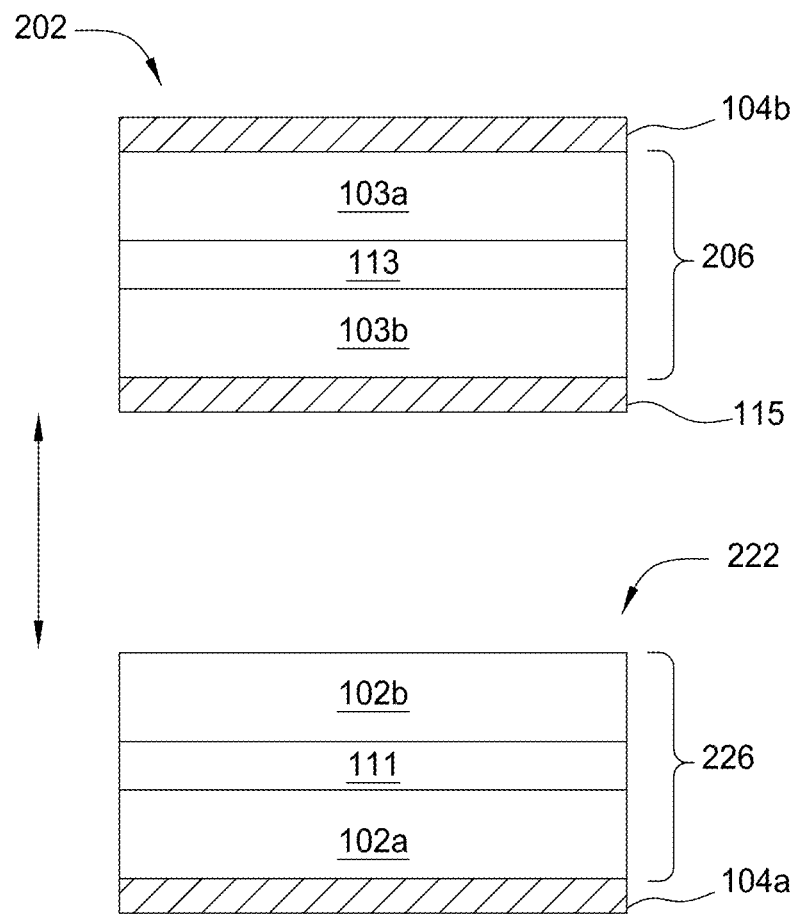
FIG. 2 is a schematic diagram of a cross-sectional view of one embodiment of a cathode stack and an anode stack with an electrospun polymer separator formed according to embodiments described herein.
Figure 3:
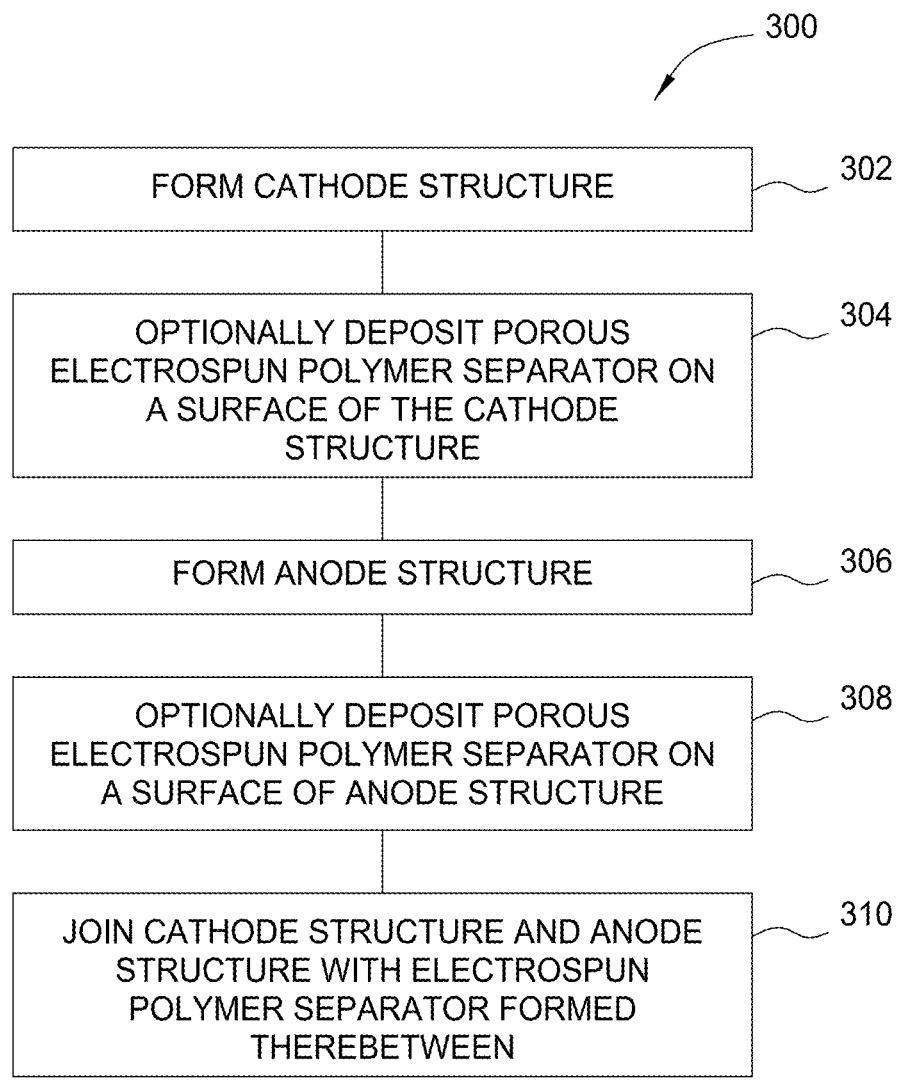
FIG. 3 is a process flow chart summarizing one embodiment of a method for forming the cathode stack and the anode stack of FIG. 2 according to embodiments described herein.

FIG. 2 is a schematic diagram of a cross-sectional view of one embodiment of a cathode stack 202 and an anode stack 222 with an electrospun polymer separator formed according to embodiments described herein. FIG. 3 is a process flow chart summarizing one embodiment of a method 300 for forming the cathode stack 202 and the anode stack 222 with an electrospun separator 115 positioned therebetween of FIG. 2 according to embodiments described herein. In one embodiment, the cathode stack 202 comprises a bi-layer cathode structure 206, separator layer 104b, and electrospun separator 115.

At block 302, the bi-layer cathode structure 206 is formed. In one embodiment, the bi-layer cathode structure 206 comprises a first cathode structure 103a, a cathodic current collector 113, and a second cathode structure 103b as depicted in FIG. 2. In one embodiment, the cathode stack 202 comprises a single layer cathode structure as depicted in FIG. 1B.

The cathode structures 103a, 103b may comprise any structure for retaining lithium ions. In certain embodiments, the cathode structures 103a, 103b have a graded particle size throughout the cathode electrode structure. In certain embodiments, the cathode structures 103a, 103b comprise a multi-layer structure where the layers comprise cathodically active materials having different sizes and/or properties. Exemplary cathode structures are described in commonly assigned U.S. patent application Ser. No. 12/953,134, filed Jan. 13, 2010, titled GRADED ELECTRODE TECHNOLOGIES FOR HIGH ENERGY LITHIUM-ION BATTERIES, now published as US 2011/0168550.

In one embodiment, the cathode structures 103a, 103b comprise a porous structure comprising a cathodically active material. In one embodiment, the cathodically active material is selected from the group comprising: lithium cobalt dioxide ($LiCoO_2$), lithium manganese dioxide ($LiMnO_2$), titanium disulfide ($TiS_2$), $LiNi_xCo_{1-2x}MnO_2$, $LiMn_2O_4$, $LiFePO_4$, $LiFe_{1-x}MgPO_4$, $LiMoPO_4$, $LiCoPO_4$, $Li_3V_2(PO_4)_3$, $LiVOPO_4$, $LiMP_2O_7$, $LiFe_{1.5}P_2O_7$, $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, $Na_5V_2(PO_4)_2F_3$, $Li_2FeSiO_4$, $Li_2MnSiO_4$, $Li_2VOSiO_4$, $LiNiO_2$, and combinations thereof. In one embodiment, the cathode structures further comprise a binding agent selected from the group comprising: polyvinylidene fluoride (PVDF), carboxymethyl cellulose (CMC), and water-soluble binding agents, such as styrene butadiene rubber (SBR), conductive binder, and other low or no-solvent binders.

In one embodiment, the cathode structure may be applied using powder application techniques including but not limited to sifting techniques, electrostatic spraying techniques, thermal or flame spraying techniques, plasma spraying techniques, fluidized bed coating techniques, slit coating techniques, roll coating techniques, and combinations thereof, all of which are known to those skilled in the art. In certain embodiments, the cathode electrodes have a graded porosity such that the porosity varies throughout the structure of the cathode electrode. In certain embodiments, where a dual-sided bi-layer electrode is formed, such as the bi-layer cathode structure 206 depicted in FIG. 2, the cathode structure 103a and the cathode structure 103b may be simultaneously deposited on opposing sides of the cathodic current collector 113 using a dual-sided deposition process. For example, a dual-sided electrostatic spraying process which uses opposing spray applicators to deposit cathodically active material on opposing sides of the substrate. One exemplary embodiment of a dual-sided electrostatic spraying chamber is disclosed in commonly assigned U.S. patent application Ser. No. 12/880,564, titled SPRAY DEPOSITION MODULE FOR AN IN-LINE PROCESSING SYSTEM, filed Sep. 13, 2010 to Bachrach et al.

At block 304 a porous electrospun separator 115 may be deposited on a surface of the cathode structure 206. The electrospun separator 115 may be deposited using any of the methods described in FIG. 4 through FIG. 8. The porous electrospun separator 115 comprises one or more polymers.

The porous electrospun separator may further comprise an inorganic filler or ceramic particles. Exemplary ceramic particles include $Pb(Zr,Ti)O_3$ (PZT), $Pb(Mg_{1/3}Nb_{2/3})O_3$—$PbTiO_3$ (PMN-PT), $BaTiO_3$, $HfO_2$ (hafnia), $SrTiO_3$, $TiO_2$ (titania), $SiO_2$ (silica), $Al_2O_3$ (alumina), $ZrO_2$ (zirconia), $SnO_2$, $CeO_2$, MgO, CaO, $Y_2O_3$, $CaCO_3$, and combinations thereof. In one embodiment, the ceramic particles are selected from the group comprising $SiO_2$, $Al_2O_3$, MgO, and combinations thereof. In certain embodiments, the ceramic particles may have a particle size between about 50 nm to about 0.5 μm. The small particle size of the ceramic particles makes it more difficult for lithium dendrites formed during the cycling process from growing through the separator and causing shorts. In certain embodiments, the ceramic particle slurry may further comprise a binder selected from PVDF, carboxymethyl cellulose (CMC), and styrene-butadiene (SBR). In one embodiment, the integrated electrospun separator 115 comprises about 10-60 wt % binder with the remainder being ceramic particles.

The electrospun separator may comprise nano-fibers having a diameter between about 50 nanometer and 1,000 nanometers, for example, between 100 nanometers and 200 nanometers. The electrospun separator may have a thickness from about 1 micron to about 100 microns, for example, from about 1 micron to about 20 microns. The electrospun separator may have porosity between about 40% to about 90% as compared to a solid film formed from the same material.

At block 306, an anode stack 222 is formed. In one embodiment, the anode stack 222 comprises a bi-layer anode structure 226 and separator 104. In one embodiment, the bi-layer anode structure 226 comprises a first anode structure 102a, an anodic current collector 111, and a second anode structure 102b as depicted in FIG. 2. In one embodiment, the anode stack 222 comprises a single layer anode structure as depicted in FIG. 1B.

In one embodiment, the anode structures 102a, 102b may be carbon based porous structure, either graphite or hard carbon, with particle sizes around 5-15 μm. In one embodiment, the lithium-intercalation carbon anode is dispersed in a matrix of polymeric binding agent. Carbon black may be added to enhance power performance. The polymers for the binding agent matrix are made of thermoplastic or other polymers including polymers with rubber elasticity. The polymeric binding agent serves to bind together the active material powders to preclude crack formation and promote adhesion to the collector foil. The quantity of polymeric binding agent may be in the range of 1% to 40% by weight. The electrolyte containing porous material of the anode structures 102a, 102b may be made from materials described above, for example, graphitic particles dispersed in a polymer matrix and/or various fine powders, for example, micro-scale or nano-scale sized powders. Additionally, microbeads of silicon, tin, or lithium titanate ($Li_4Ti_5O_{12}$) may be used with, or instead of, graphitic microbeads to provide the conductive core anode material.

In one embodiment, the anode structures comprise conductive microstructures formed as a three dimensional, columnar growth of material by use of a high plating rate electroplating process performed at current densities above the limiting current ($i_L$). The diffusion-limited electrochemical plating process by which conductive microstructures in which the electroplating limiting current is met or exceeded, thereby producing a low-density metallic meso-porous/columnar structure rather than a conventional high-density conformal film. Different configurations of conductive microstructures are contemplated by embodiments described herein. The conductive microstructures may comprise materials selected from the group comprising copper, tin, silicon, cobalt, titanium, alloys thereof, and combinations thereof. Exemplary plating solutions and process conditions for formation of the conductive microstructures are described in commonly assigned U.S. patent application Ser. No. 12/696,422, filed Jan. 29, 2010, to Lopatin et al., titled POROUS THREE DIMENSIONAL COPPER, TIN, COPPER-TIN, COPPER-TIN-COBALT, AND COPPER-TIN-COBALT-TITANIUM ELECTRODES FOR BATTERIES AND ULTRA CAPACITORS, which is herein incorporated by reference in its entirety.

In one embodiment, the current collectors 111 and 113 may comprise a material individually selected from the group comprising aluminum (Al), copper (Cu), zinc (Zn), nickel (Ni), cobalt (Co), tin (Sn), silicon (Si), manganese (Mn), magnesium (Mg), alloys thereof, and combinations thereof. In one embodiment, the cathodic current collector 113 is aluminum and the anodic current collector 111 is copper. Examples of materials for the positive current collector 113 (the cathode) include aluminum, stainless steel, and nickel. Examples of materials for the negative current collector 111 (the anode) include copper (Cu), stainless steel, and nickel (Ni). Such collectors can be in the form of a foil, a film, or a thin plate. In certain embodiments, the collectors have a thickness that generally ranges from about 5 to about 50 μm.

At block 308 a porous electrospun separator 115 may be deposited on a surface of the anode structure 226. The electrospun separator 115 may be deposited using any of the methods described in FIG. 4 through FIG. 8. The electrospun separator may be deposited on the cathode stack 202, the anode stack 222, or both prior to joining the anode stack 222 and the cathode stacks 202 together at block 308.

At block 310, the cathode stack 202 and the anode stack 222 are joined together with the electrospun separator formed therebetween. In one embodiment, the cathode stack 202 and the anode stack 222 may be packaged using a lamination process with a packaging film-foil, such as, for example, an $Al/Al_2O_3$ foil.

Figure 4:
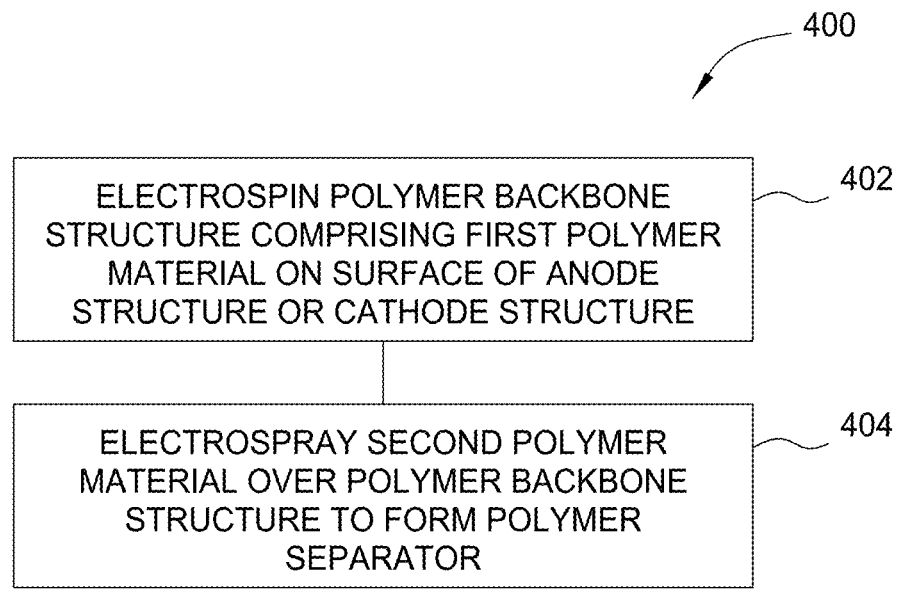
FIG. 4 is a process flow chart summarizing one embodiment of a method for forming an electrospun integrated separator according to embodiments described herein.

FIG. 4 is a process flow chart summarizing one embodiment of another method 400 for forming an electrospun integrated separator according to embodiments described herein. At block 402, a polymer backbone structure comprising a first polymer material is electrospun on a surface of an anode structure or a cathode structure. At block 404, a second polymer material is formed over the polymer backbone structure using an electrospinning or electrospraying process to form the integrated polymer separator 115. The second polymer material may be used to reinforce or strengthen the polymer backbone structure comprising the first polymer material.

Figure 5:
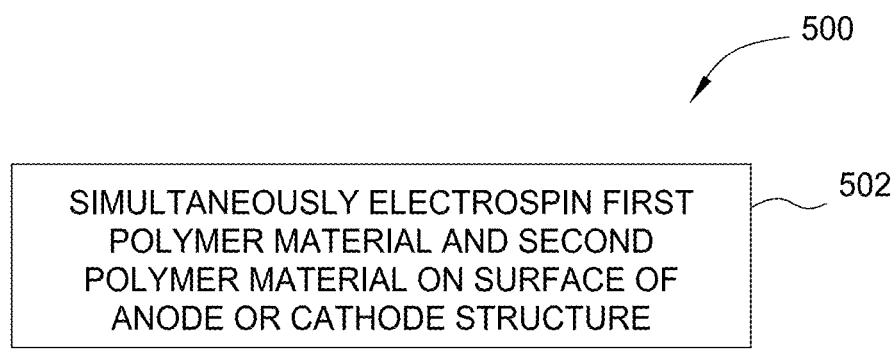
FIG. 5 is a process flow chart summarizing one embodiment of another method for forming an electrospun integrated separator according to embodiments described herein.

FIG. 5 is a process flow chart summarizing one embodiment of another method 500 for forming an electrospun integrated separator according to embodiments described herein. At block 502, a first polymer material and a second polymer material are simultaneously electrospun on a surface of the anode structure or on a surface of the cathode structure.

In certain embodiments which use multiple polymer materials, the first polymer material layer may comprise a polymer material having a high melting temperature ($T_m$) (e.g., greater than 200° C.) and the second polymer material layer may comprise a polymer material having a low melting temperature (e.g., less than 140° C.). In one embodiment, the first polymer material layer comprises a polymer material having a high melting temperature selected from the group comprising polyamide 6,6. In one embodiment, the second polymer material layer comprises a lower melting temperature polymer, such as SBR with a $T_m$ of about 150° C. Thus, during thermal runaway, the lower melting temperature polymer lines are melted and fused together, reducing porosity in the layer and thus slow down Li-ion transport and the associated electrochemical reactions.

Figure 6:
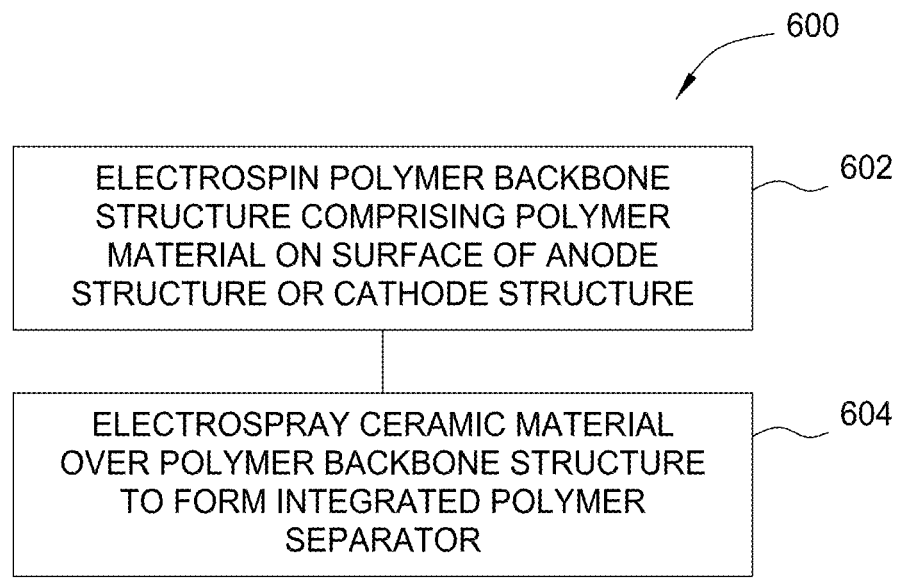
FIG. 6 is a process flow chart summarizing one embodiment of another method for forming an electrospun integrated separator according to embodiments described herein.

FIG. 6 is a process flow chart summarizing one embodiment of another method 600 for forming an electrospun integrated separator according to embodiments described herein. At block 602, a polymer backbone structure comprising a first polymer material is electrospun on a surface of an anode structure or a surface of a cathode structure. At block 604, a ceramic material is deposited over the polymer backbone structure using for example an electrospraying process to form the integrated polymer separator 115.

Figure 7:
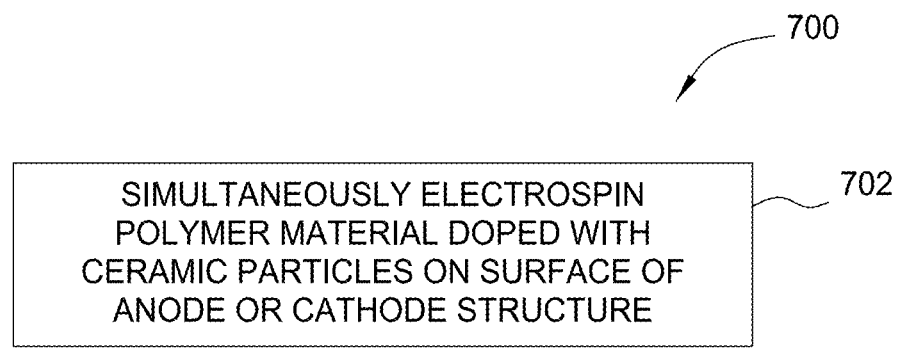
FIG. 7 is a process flow chart summarizing one embodiment of another method for forming an electrospun integrated separator according to embodiments described herein.

FIG. 7 is a process flow chart summarizing one embodiment of another method 700 for forming an electrospun integrated separator according to embodiments described herein. At block 702 a polymer material doped with ceramic particles is simultaneously electrospun on a surface of the anode structure of the cathode structure. The ceramic particles may be incorporated with the polymer solution prior to the electrospinning process.

In embodiments where the separator 115 comprises ceramic particles, the ceramic particles may be deposited by electrospinning, directly spraying or coating a ceramic particle polymer slurry directly onto a surface of the cathode structures 103a, 103b or anode structures 102a, 102b.

In one embodiment, the ceramic particles are applied as a powder using powder application techniques including but not limited to sifting techniques, electrostatic spraying techniques, thermal or flame spraying techniques, plasma spraying techniques, fluidized bed coating techniques, slit coating techniques, roll coating techniques, and combinations thereof, all of which are known to those skilled in the art. In one embodiment, the spray process is a semi-dry spray process where the substrate is heated prior to the spray process to facilitate drying of each layer as it is deposited.

Figure 8:
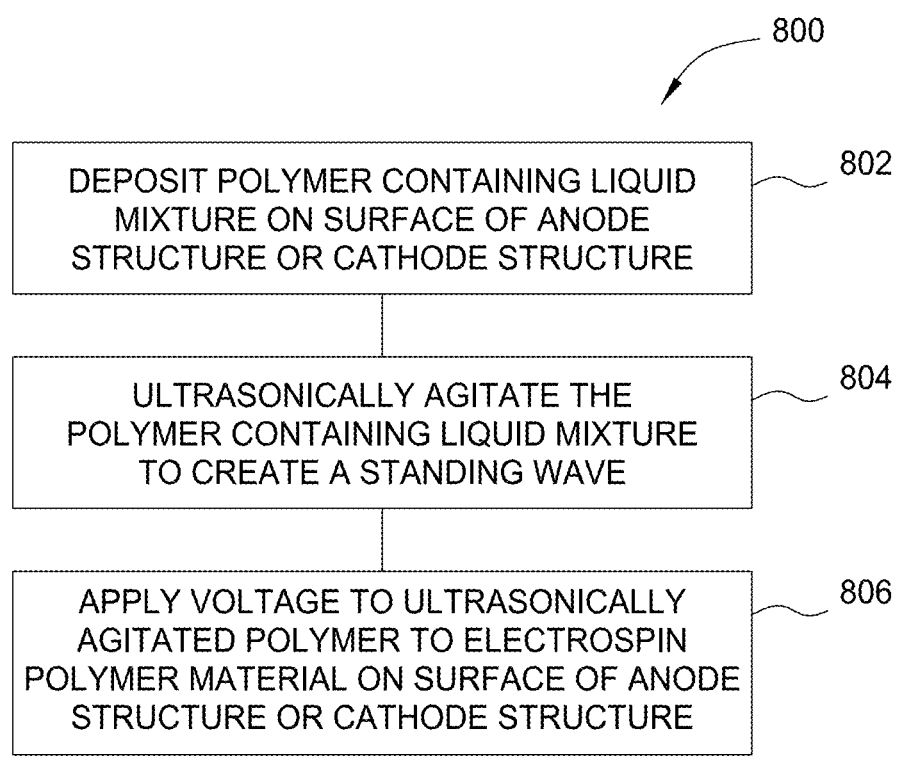
FIG. 8 is a process flow chart summarizing one embodiment of another method for forming an electrospun integrated separator according to embodiments described herein.

FIG. 8 is a process flow chart summarizing one embodiment of another method 800 for forming an electrospun integrated separator according to embodiments described herein. At block 802, a polymer containing liquid mixture is deposited on the anode structure and/or the cathode structure. The polymer containing liquid mixture may be a polymer solution or polymer melt as described herein. At block 804, the polymer containing liquid mixture is ultrasonically or megasonically agitated to create a standing wave within the polymer containing liquid mixture. At block 806, voltage is applied to the ultrasonically agitated polymer containing liquid mixture to electrospin the polymer material on the surface of the cathode structure and/or the anode structure. It is believed that the use of ultrasonic agitation creates multiple jets from the polymer containing liquid mixture leading to an increase in the deposition rate of the electrospinning process.

Figure 9:
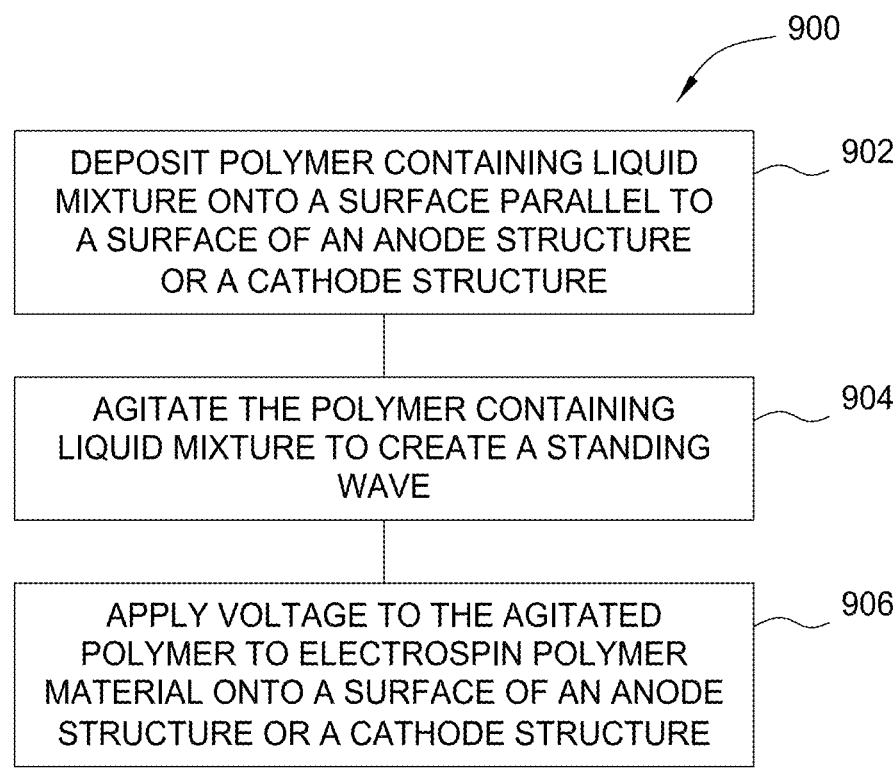
FIG. 9 is a process flow chart summarizing one embodiment of another method for forming an electrospun integrated separator according to embodiments described herein.

FIG. 9 is a process flow chart summarizing one embodiment of another method 900 for forming an electrospun integrated separator according to embodiments described herein. At block 902, a polymer containing liquid mixture is deposited onto a surface parallel to a surface of an anode or a surface of a cathode. At block 904, the polymer containing liquid mixture is ultrasonically or megasonically agitated to create a standing wave within the polymer containing liquid mixture. At block 906, voltage is applied to the ultrasonically agitated polymer containing liquid mixture to electrospin the polymer material onto the surface of the cathode structure and/or the surface of the anode structure.

Figure 10:
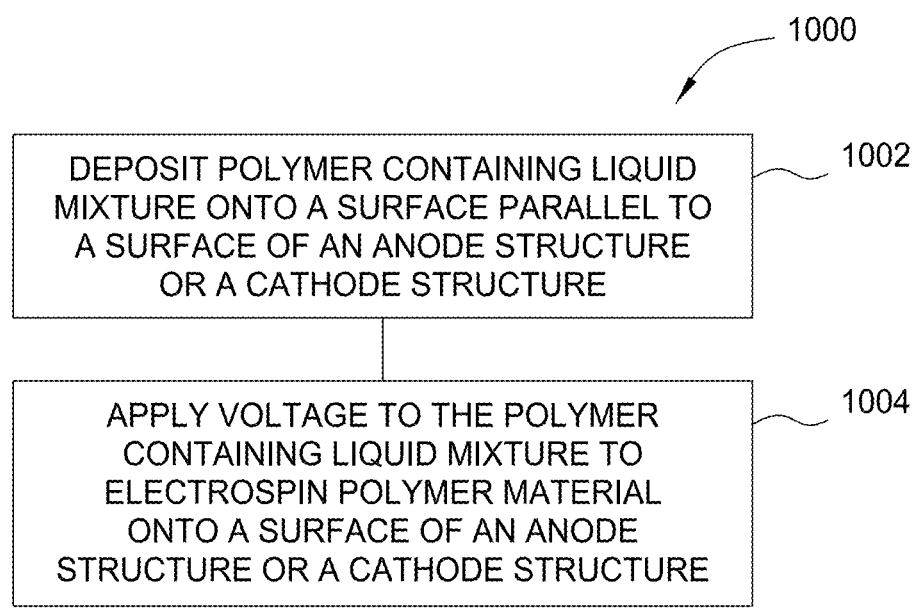
FIG. 10 is a process flow chart summarizing one embodiment of another method for forming an electrospun integrated separator according to embodiments described herein.

FIG. 10 is a process flow chart summarizing one embodiment of another method 1000 for forming an electrospun integrated separator according to embodiments described herein. At block 1002, a polymer containing liquid mixture is deposited onto a surface parallel to a surface of an anode structure or a cathode structure. At block 1004, a voltage is applied to the polymer containing liquid mixture to electrospin a polymer material onto a surface of the anode structure or the cathode structure.

Figure 11:
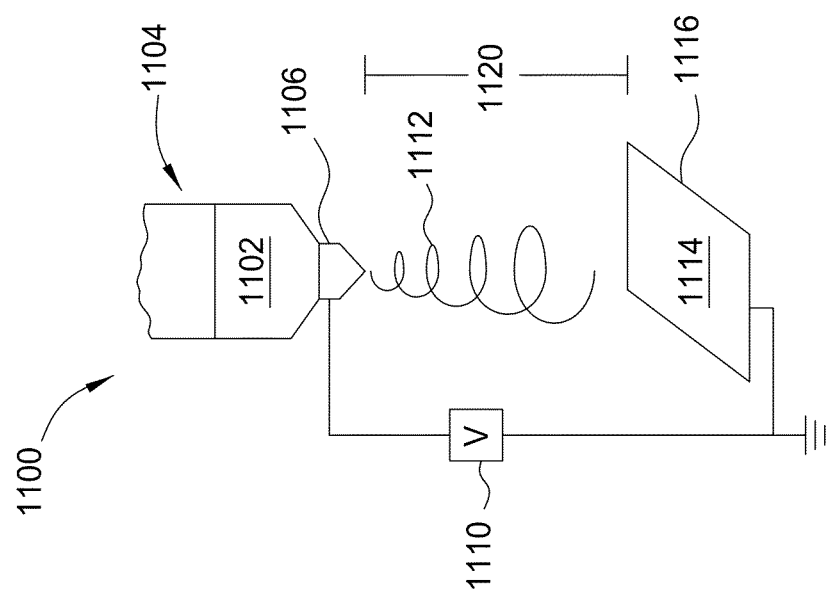
FIG. 11 schematically illustrates one embodiment of an apparatus for electrospinning an integrated separator onto an electrode surface according to embodiments described herein.

FIG. 11 schematically illustrates one embodiment of an apparatus 1100 for electrospinning an integrated separator onto an electrode surface according to embodiments described herein. The apparatus 1100 may be enclosed in a vacuum environment. A polymer containing liquid mixture 1102 in a syringe 1104 is pushed through a metallic needle 1106, which is coupled with a voltage supply 1110. The voltage supply may be configured to supply between about 5 kV to 120 kV to the tip of the metallic needle 1106. The voltage supply may be configured to supply between about 30 kV to 120 kV to the tip of the metallic needle 1106. The voltage supply may depend upon such factors as the type of polymer used, the pore size desired, and the rate of production.

A polymer jet 1112 is emitted from the tip of the metallic needle 1106 toward a grounded surface 1114 of an electrode structure 1116. The jet is elongated by a whipping process caused by electrostatic repulsion initiated at small bends in the fiber, until it is finally deposited on the grounded surface 1114 of the electrode structure 1116. The diameter of the fibers may be controlled by adjusting the solvent concentration in the polymer solution, adjusting a gap distance 1120 between the tip of the metallic needle 1106 and the grounded surface 1114 of the electrode structure. The gap distance 1120 between the tip of the metallic needle 1106 and the grounded surface 1114 of the electrode structure may be between about 1 mm to about 1,000 mm. The diameter of the polymer fibers may be between about 80 nm and about 300 nm.

Figure 12:
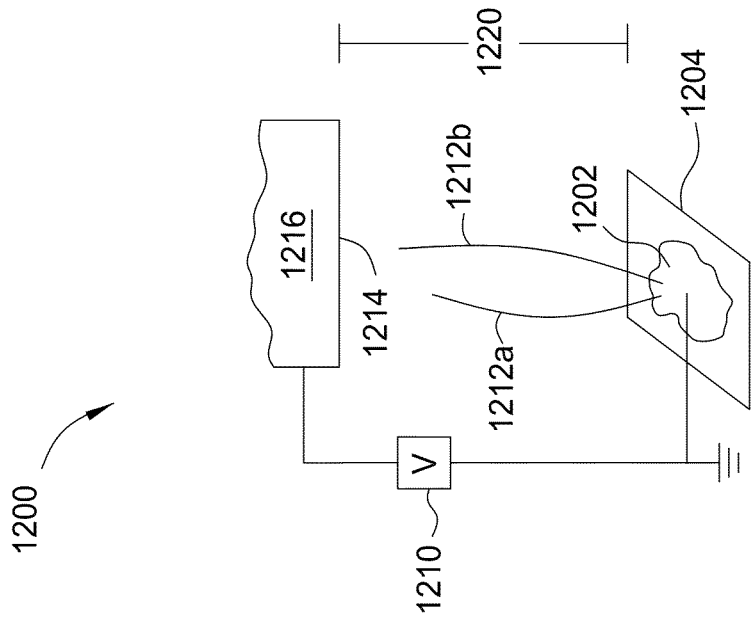
FIG. 12 schematically illustrates another embodiment of an apparatus for electrospinning an integrated separator onto an electrode surface according to embodiments described herein.

FIG. 12 schematically illustrates another embodiment of an apparatus 1200 for electrospinning an integrated separator onto a grounded surface 1214 of an electrode structure 1216 according to embodiments described herein. The apparatus 1200 depicted in FIG. 12 is used for needless electrospinning. The apparatus 1200 may be enclosed in a vacuum environment. A polymer containing liquid mixture 1202 may be positioned in a container 1204, which is coupled with a voltage supply 1210 via an electrode. The voltage supply may be configured to supply between about 5 kV to 120 kV to the polymer containing liquid mixture 1202. The voltage supply may be configured to supply between about 30 kV to 120 kV to the polymer containing liquid mixture 1202. The voltage supply may depend upon such factors as the type of polymer used, the pore size desired, and the rate of production.

Polymer jets 1212a, 1212b are emitted from the tip of the polymer containing liquid mixture 1202 toward a grounded surface 1214 of the electrode structure 1216. The jet is elongated by a whipping process caused by electrostatic repulsion initiated at small bends in the fiber, until it is finally deposited on the grounded surface 1214 of the electrode structure 1216. The diameter of the fibers may be controlled by adjusting the solvent concentration in the polymer containing liquid mixture 1202, adjusting a gap distance 1220 between the polymer containing liquid mixture 1202 and the grounded surface 1214 of the electrode structure 1216. The gap distance 1220 between the polymer containing liquid mixture 1202 and the grounded surface 1214 of the surface 1214 of the electrode structure 1216 may be between about 1 mm to about 1,000 mm. The diameter of the polymer fibers may be between about 80 nm and about 300 nm.

EXAMPLES

The following hypothetical non-limiting examples are provided to further illustrate embodiments described herein.

However, the examples are not intended to be all inclusive and are not intended to limit the scope of the embodiments described herein.

Example 1

A 5% by weight polyacrylic acid (PAA) in water solution is used. A small amount of sodium chloride is added to the solution to increase the ionic conductivity of the solution. The solution is loaded into a syringe with a 0.4 mm id flat capillary tip. A dc-dc convertor is used to supply from 5 to 30 kV to the tip of the capillary to form a Taylor cone with a liquid jet, and a grounded metal movable sample stage is used as the collector. The distance between the tip and the collector is varied from 50 mm to 200 mm. The samples are spun for a few minutes each, and the liquid flow rate is manually adjusted to maintain a small droplet of solution on the tip of the capillary. A Universal Serial Bus (USB) camera microscope is used to observe the liquid emission from the tip during the spinning process.

Example 2

A 10% by weight Nylon-6 (formic acid), 5% by weight silica, solution is used. The solution is loaded into a syringe with a 0.4 mm id flat capillary tip. A dc-dc convertor is used to supply from 5 to 30 kV to the tip of the capillary to form a Taylor cone with a liquid jet, and a grounded metal movable sample stage is used as the collector. The distance between the tip and the collector is varied from 50 mm to 200 mm. The samples are spun for a few minutes each, and the liquid flow rate is manually adjusted to maintain a small droplet of solution on the tip of the capillary. A Universal Serial Bus (USB) camera microscope is used to observe the liquid emission from the tip during the spinning process.

Figure 13B:
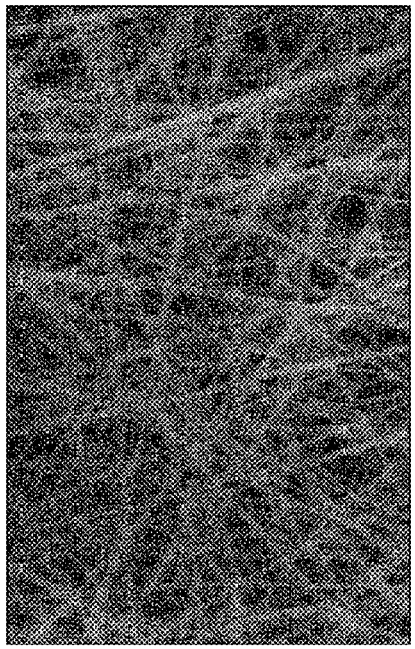
FIGS. 13A and 13B are schematic representations of a scanning electron microscope (SEM) image of electrospun non-woven polymer fibers deposited according to embodiments described herein.
Figure 13A:
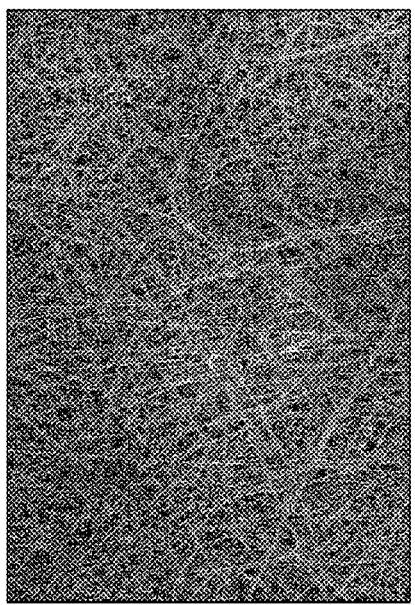

FIGS. 13A and 13B are schematic representations of a scanning electron microscope (SEM) image of the resulting electrospun non-woven polymer fibers. As depicted in FIGS. 13A and 13B, an electrospun layer with highly uniform size distribution of randomly oriented fibers is obtained, with the average fiber size from approximately 100 to 200 nm. The porosity of the obtained electrospun layer is believed to be greater than 90%. For the electrospun fibers depicted in FIGS. 9A and 9B, the process was run at 20 cm spacing between the needle tip and the collector surface and at a 20 kV tip voltage. The polymer solution was 8 wt. % PAA in water with 0.65 wt. % NaCl added to increase conductivity.

Figure 14B:
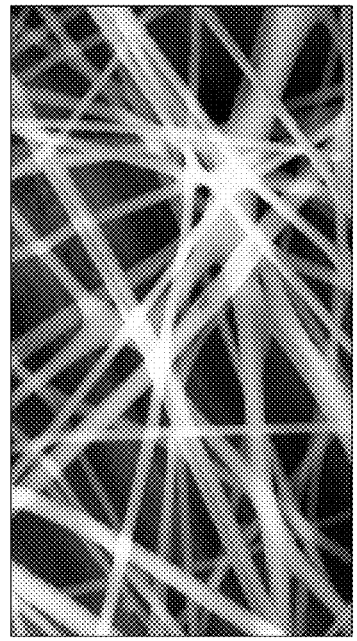
FIGS. 14A and 14B are schematic representations of an SEM image of electrospun fibers deposited according to embodiments described herein.
Figure 14A:
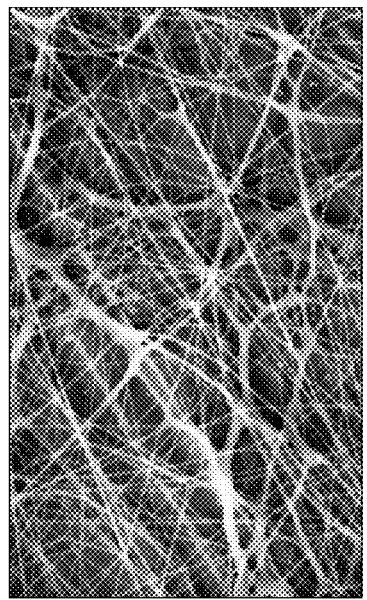

FIGS. 14A and 14B are schematic representations of an SEM image of electrospun fibers deposited according to embodiments described herein. The electrospun fibers depicted in FIGS. 14A and 14B demonstrate that the diameter of the electrospun fibers may be controlled by the adjustment of the polymer solution concentration as well as a variation in distance between the jet and the collector surface. For the electrospun fibers depicted in FIGS. 14A and 14B, the process was run at 20 cm spacing between the needle tip and the collector surface and at a 20 kV tip voltage.

Figure 15B:
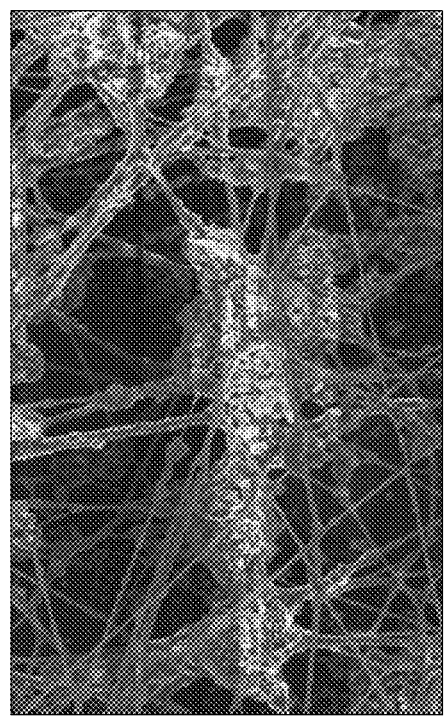
FIGS. 15A and 15B are schematic representations of an SEM image of ceramic loaded electrospun fibers deposited according to embodiments described herein.
Figure 15A:
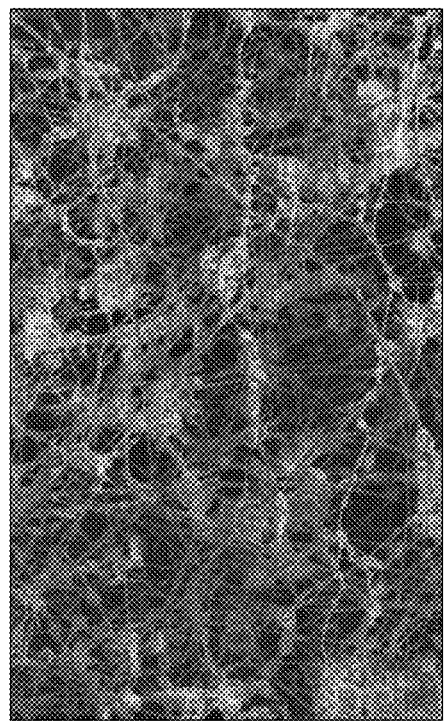

FIGS. 15A and 15B are schematic representations of an SEM image of ceramic loaded electrospun fibers deposited according to embodiments described herein. FIGS. 15A and 15B demonstrate one approach to further engineer the separator properties by loading the polymer solution with ceramic powders to enhance the mechanical strength of the electrospun polymer layer. The resultant mat in FIGS. 15A and 15B shows agglomerated $SiO_2$ regions connected by electrospun polymer fibers.

Figure 16:
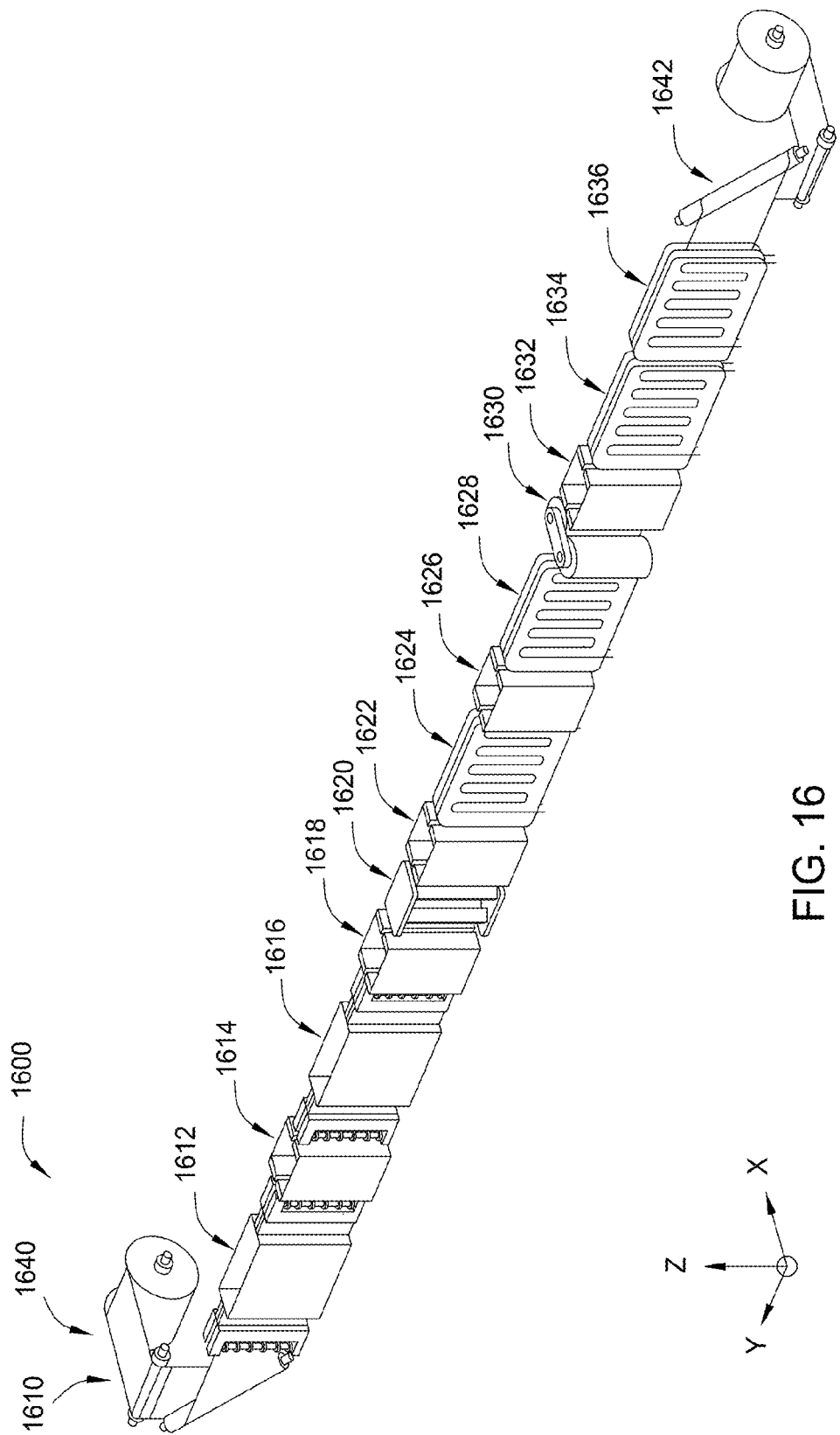
FIG. 16 schematically illustrates one embodiment of a processing system according to embodiments described herein.

FIG. 16 schematically illustrates one embodiment of a vertical processing system 1600 for forming a porous electrospun separator according to embodiments described herein. The processing system 1600 may comprise a plurality of processing chambers 1612-1636 arranged in a line, each configured to perform processing steps to a flexible conductive substrate 1610. In one embodiment, the processing chambers 1612-1636 are stand alone modular processing chambers wherein each modular processing chamber is structurally separated from the other modular processing chambers. Therefore, each of the stand alone modular processing chambers, can be arranged, rearranged, replaced, or maintained independently without affecting each other. The processing chambers 1612-1636 may be configured to perform a simultaneous two-sided process to simultaneously process each side of the flexible conductive substrate 1610.

The processing system 1600 may comprise a microstructure formation chamber 1612 for forming either a portion of a porous anode structure or a portion of a porous cathode structure over the flexible conductive substrate. In one embodiment, the microstructure formation chamber is selected from a plating chamber, an imprint chamber, an embossing chamber, and an electrochemical etching chamber.

The processing system 1600 may further comprise a first rinse chamber 1614 configured to rinse and remove any residual particles and processing solution from the portion of the vertically oriented conductive flexible substrate 1610 with a rinsing fluid, for example, de-ionized water, after the imprinting process.

The processing system 1600 may further comprise a second microstructure formation chamber 1616 disposed next to the first rinse chamber 1614 for forming either a portion of the porous anode structure or a portion of the porous cathode structure over the flexible conductive substrate. In one embodiment, the second microstructure formation chamber 1616 is configured to perform an etching process on at least a portion of the flexible conductive substrate 1610 to form the cathode structure or the anode structure. Chamber 1612 and chamber 1616 may individually comprise a chamber selected from an imprint chamber, a wet etch chamber, an electrochemical etching chamber, a pattern punch-through chamber, and combinations thereof.

The processing system 1600 may further comprise a second rinse chamber 1618 configured to rinse and remove any residual etching solution from the portion of the conductive flexible substrate 1610 with a rinsing fluid, for example, de-ionized water, after the wet etch process has been performed. In one embodiment, a chamber 1620 comprising an air-knife is positioned adjacent to the second rinse chamber 1618.

The processing system 1600 may further comprise a pre-heating chamber 1622 configured to expose the flexible conductive substrate 1610 to a drying process to remove excess moisture from the deposited porous structure. In one embodiment, the pre-heating chamber 1622 contains a source configured to perform a drying process such as an air drying process, an infrared drying process, an electromagnetic drying process, or a marangoni drying process.

The processing system 1600 may further comprise a first spray coating chamber 1624 configured to deposit electroactive particles such as cathodically active or anodically active particles, over and/or into the porous anode or cathode structure formed over the flexible conductive substrate 1610. Although discussed as a spray coating chamber, the first spray coating chamber 1624 may be configured to perform any of the aforementioned deposition processes.

The processing system 1600 may further comprise a post-drying chamber 1626 disposed adjacent to the first spray coating chamber 1624 configured to expose the flexible conductive substrate 1610 to a drying process. In one embodiment, the post-drying chamber 1626 is configured to perform a drying process such as an air drying process, for example, exposing the conductive substrate 1610 to heated nitrogen, an infrared drying process, a marangoni drying process, or an annealing process, for example, a rapid thermal annealing process.

The processing system 1600 may further comprise a second spray coating chamber 1628 positioned adjacent to the post-drying chamber 1626. Although discussed as a spray coating chamber, the second spray coating chamber 1628 may be configured to perform any of the aforementioned deposition processes. In one embodiment, the second spray coating chamber is configured to deposit anodically or cathodically active particles, over the porous conductive structure formed on the flexible conductive substrate 1610. In one embodiment, the second spray coating chamber 1628 is configured to deposit an additive material such as a binder over the vertically oriented conductive substrate 1610.

The processing system 1600 may further comprise a compression chamber 1630 disposed adjacent to the second spray coating chamber 1628 configured to expose the flexible conductive substrate 1610 to a calendaring process to compress as-deposited electro-active particles into the conductive microstructure.

In one embodiment, the processing system 1600 further comprises a third drying chamber 1632 disposed adjacent to an electrospinning chamber 1634 configured to expose the flexible conductive substrate 1610 to a drying process such as an air drying process, for example, exposing the flexible conductive substrate 1610 to heated nitrogen, an infrared drying process, a marangoni drying process, or an annealing process, for example, a rapid thermal annealing process.

In one embodiment, the processing system 1600 further comprises the electrospinning chamber 1634 positioned adjacent to the third drying chamber 1632 for forming at least a portion of a porous electrospun polymer separator over the flexible conductive substrate 1610 according to embodiments described herein.

In one embodiment, the processing system 1600 further comprises a third spray coating chamber 1636 for forming at least a portion of a porous electrospun polymer separator over the flexible conductive substrate 1610 positioned adjacent to the third spray coating chamber 1636. Although discussed as a spray coating chamber, the third spray coating chamber 1636 may be configured to perform any of the aforementioned deposition processes.

In certain embodiments, the processing system 1600 further comprises additional processing chambers. The additional modular processing chambers may comprise one or more processing chambers selected from the group of processing chambers comprising an electrochemical plating chamber, an electroless deposition chamber, a chemical vapor deposition chamber, a plasma enhanced chemical vapor deposition chamber, an atomic layer deposition chamber, a rinse chamber, an anneal chamber, a drying chamber, a spray coating chamber, additional spray chamber, polymer deposition chamber and combinations thereof. It should also be understood that additional chambers or fewer chambers may be included in the in-line processing system.

The processing chambers 1612-1636 are generally arranged along a line so that portions of the vertically oriented conductive substrate 1610 can be streamlined through each chamber through feed roll 1640 and take up roll 1642. In one embodiment, as the vertically oriented substrate 1610 leaves the take up roll 1642, the substrate 1610 is further processed to form a prismatic assembly.

It should also be understood that although discussed as a system for processing a vertically oriented substrate, the same processes may be performed on substrates having different orientations, for example, a horizontal orientation. Details of a horizontal processing system that can be used with the embodiments described herein are disclosed in commonly assigned U.S. patent application Ser. No. 12/620,788, titled APPARATUS AND METHOD FOR FORMING 3D NANOSTRUCTURE ELECTRODE FOR ELECTROCHEMICAL BATTERY AND CAPACITOR, to Lopatin et al., filed Nov. 18, 2009, now published as US2010-0126849 of which FIGS. 5A-5C, 6A-6E, 7A-7C, and 8A-8D and text corresponding to the aforementioned figures are incorporated by reference herein. In certain embodiments, the vertically oriented substrate may be slanted relative to a vertical plane. For example, in certain embodiments, the substrate may be slanted from between about 1 degree to about 20 degrees from the vertical plane.

Certain embodiments described herein have demonstrated a technique to form highly porous membranes of nano-fibers that may be applied in-situ and used as an integrated separator for Li-ion battery manufacturing. This integrated separator deposition technique would allow for significant cost reduction and simplification for current battery manufacturing processes.

While the foregoing is directed to embodiments of the present invention, other and further embodiments of the invention may be devised without departing from the basic scope thereof, and the scope thereof is determined by the claims that follow.

The invention claimed is:

1. A lithium-ion battery having an electrode structure, comprising:
   an anode stack, comprising:
      an anodic current collector; and
      an anode structure formed over a first surface of the anodic current collector;
   a cathode stack, comprising:
      a cathodic current collector; and
      a cathode structure formed over a first surface of the cathodic current collector; and
   a porous electrospun polymer separator positioned between the anode structure and the cathode structure comprising:
      an electrospun nano-fiber backbone structure, comprising:
         electrospun nano-fibers formed from a first polymer material; and
         ceramic particles embedded in the electrospun nano-fibers, wherein the ceramic particles form agglomerated regions connected by the electrospun nano-fibers.

2. The lithium-ion battery of claim 1, wherein the ceramic particles are selected from the group consisting of: $Pb(Zr,Ti)O_3$ (PZT), $Pb(Mg_{1/3}Nb_{2/3})O_3$—$PbTiO_3$ (PMN-PT), $BaTiO_3$, $HfO_2$ (hafnia), $SrTiO_3$, $TiO_2$ (titania), $SiO_2$ (silica), $Al_2O_3$ (alumina), $ZrO_2$ (zirconia), $SnO_2$, $CeO_2$, $MgO$, $CaO$, $Y_2O_3$ and combinations thereof.

3. The lithium-ion battery of claim 2, wherein the electrospun nano-fiber backbone structure comprises a first polymer material selected from polyamides, poly(acrylic acid) (PAA), polyvinylidene fluoride (PVDF), carboxymethyl cellulose (CMC), and styrene-butadiene rubber (SBR).

4. The lithium-ion battery of claim 3, wherein the porous electrospun polymer separator further comprises a second polymer material deposited over the electrospun nano-fiber backbone structure wherein the second polymer material is different from the first polymer material.

5. The lithium-ion battery of claim 4, wherein the second polymer material is selected from the group consisting of polyamides, poly(acrylic acid) (PAA), polyvinylidene fluoride (PVDF), carboxymethyl cellulose (CMC), and styrene-butadiene rubber (SBR).

6. The lithium-ion battery of claim 1, wherein the cathode structure is a porous structure comprising a cathodically active material selected from the group consisting of: lithium cobalt dioxide ($LiCoO_2$), lithium manganese dioxide ($LiMnO_2$), titanium disulfide ($TiS_2$), $LiNixCo_{1-2x}MnO_2$, $LiMn_2O_4$, $LiFePO_4$, $LiFe_{1-x}MgPO_4$, $LiMoPO_4$, $LiCoPO_4$, $Li_3V_2(PO_4)_3$, $LiVOPO_4$, $LiMP_2O_7$, $LiFe_{1.5}P_2O_7$, $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, $Na_5V_2(PO_4)_2F_3$, $Li_2FeSiO_4$, $Li_2MnSiO_4$, $Li_2VOSiO_4$, $LiNiO_2$, and combinations thereof.

7. The lithium-ion battery of claim 2, wherein the electrospun nano-fibers of the electrospun nano-fiber backbone structure have a diameter between about 100 nanometers and about 200 nanometers.

8. The lithium-ion battery of claim 2, wherein the electrospun nano-fiber backbone structure has a porosity between about 40% to about 90%.

9. The lithium-ion battery of claim 4, wherein the first polymer material and the second polymer material form a mixed layer, the first polymer material has a melting temperature greater than 200° C. and the second polymer material comprises a plurality of polymer lines having a melting temperature less than 140° C., such that during thermal runaway, the polymer lines are melted and fused together, reducing a porosity in the mixed layer and thus slowing Li-ion transport and one or more associated electrochemical reactions.

10. The lithium-ion battery of claim 7, wherein the ceramic particles have a diameter less than 100 nanometers.

* * * * *